US012632369B2

(12) United States Patent
    Huang

(10) Patent No.: US 12,632,369 B2
(45) Date of Patent: May 19, 2026

(54) APPLICATION CRASH TESTING PLATFORM

(71) Applicant: ARC-FY, LLC, Campbell, CA (US)

(72) Inventor: Dennis Huang, Campbell, CA (US)

(73) Assignee: ARC-FY, LLC, Campbell, CA (US)

( * ) Notice: Subject to any disclaimer, the term of this patent is extended or adjusted under 35 U.S.C. 154(b) by 285 days.

(21) Appl. No.: 18/287,857

(22) PCT Filed: Apr. 26, 2022

(86) PCT No.: PCT/US2022/026339

§ 371 (c)(1),
(2) Date: Oct. 20, 2023

(87) PCT Pub. No.: WO2022/232139

PCT Pub. Date: Nov. 3, 2022

(65) Prior Publication Data

US 2024/0362155 A1      Oct. 31, 2024

Related U.S. Application Data

(60) Provisional application No. 63/180,866, filed on Apr. 28, 2021.

(51) Int. Cl.
G06F 11/3668 (2025.01)
(52) U.S. Cl.
CPC ...... G06F 11/3688 (2013.01); G06F 11/3684 (2013.01); G06F 11/3692 (2013.01)
(58) Field of Classification Search
None
See application file for complete search history.

(56) References Cited

U.S. PATENT DOCUMENTS

| | | | |
|---|---|---|---|
| 10,824,540 B2 | 11/2020 | Fiorini | |
| 2014/0089737 A1* | 3/2014 | Ethiraj | G06F 11/261 |
| | | | 714/32 |
| 2017/0300402 A1* | 10/2017 | Hoffner | G06F 11/3684 |
| 2018/0089347 A1* | 3/2018 | Yim | G06F 9/45533 |
| 2019/0286546 A1* | 9/2019 | Johnston | G06F 11/2294 |
| 2019/0354454 A1* | 11/2019 | Shmouely | G06F 11/277 |
| 2020/0210321 A1* | 7/2020 | Fiorini | G06F 1/165 |

(Continued)

FOREIGN PATENT DOCUMENTS

| | | |
|---|---|---|
| JP | 2020-144842 A | 9/2020 |
| WO | 2013095469 A1 | 6/2013 |
| WO | 2020/106779 A2 | 5/2020 |

OTHER PUBLICATIONS

Adamo et al., "Reinforcement Learning for Android GUI Testing," ACM, 2018. (Year: 2018).*

(Continued)

*Primary Examiner* — Ryan D. Coyer
(74) *Attorney, Agent, or Firm* — Procopio, Cory, Hargreaves & Savitch LLP

(57) ABSTRACT

Example implementations described herein are directed to an application crash testing platform that tests provided applications through a machine learning algorithm. Multiple instances of the application are spawned on a cloud-based platform, wherein the machine learning algorithm provides input to each of the instances until an incident causing the application to become inoperable is reached.

20 Claims, 8 Drawing Sheets

(56)         References Cited

U.S. PATENT DOCUMENTS

2020/0349466 A1     11/2020   Hoogerwerf et al.

OTHER PUBLICATIONS

Alferidah et al., "Automated Software Testing Tools," ResearchGate, 2020. (Year: 2020).*

International Search Report and Written Opinion for International Application No. PCT/US2022/026339, ISA/US, mail date Sep. 2, 2022, in 7 pages.

Office Action for corresponding JP Patent Application No. 2023-507983, dated Aug. 7, 2023, in 6 pages.

* cited by examiner

| Input Device | Input options | Excluded Inputs | Type of input |
|---|---|---|---|
| Keyboard type 1 | KEY1 | None | USB |
| Mouse type 1 | MOUSE1 | EXMOUS1 | Wireless |
| Joystick type 1 | JOY1 | EXJOY1 | USB |
| Touch Screen 1 | TOUCH1 | EXTOUCH1 | Display |
| •••• | •••• | •••• | |

FIG. 3

| Type of incident | Input options |
|---|---|
| Memory Fault | Page fault screen reached |
| Freeze | Screen does not change in response to any input after a threshold period of time |
| Exception screen | Exception screen reached |
| Cursor / character lock | Same set of screen frames occur in response to all inputs after a threshold period of time |
| •••• | •••• |

FIG. 4

| Application ID | Type of Incident to test | Configuration settings | User ID |
|---|---|---|---|
| Application 1 | Freeze, Blue screen, infinite loop | Input Device 1, 2.4 GM RAM, OS 1 | User 1 |
| Application 2 | Infinite loop | Input Device 2, Device 3 | User 2 |
| •••• | •••• | •••• | •••• |
| •••• | •••• | •••• | •••• |
| •••• | •••• | •••• | |

FIG. 5

APPLICATION CRASH TESTING PLATFORM

CROSS-REFERENCE TO RELATED APPLICATIONS

This U.S. patent application is based on and claims the benefit of domestic priority under 35 U.S.C 119 (e) from provisional U.S. patent application No. 63/180,866, filed on Apr. 28, 2021, the disclosure of which is hereby incorporated by reference herein in its entirety.

BACKGROUND

Field

The present disclosure relates generally to software as a service (SaaS) platforms, and more specifically, through facilitating a platform for application crash testing using machine learning.

Related Art

In the related art, developers often employ quality assurance testers to test applications for bugs, memory faults, and crashes. Such quality assurance testers often spend many man hours attempting various inputs to an application to test if the application will crash under certain conditions.

SUMMARY

Example implementations described herein take advantage of advances in machine learning and cloud platforms to facilitate an application crash testing platform to test an application for specific, definable crashes or faults. Through the example implementations described herein, quality assurance testers can utilize the platform to test an application for particular types of crashes, faults, or other definable incidents that render the application to be inoperable. When such incidents are definable and set as a victory condition for the machine learning algorithm, the machine learning algorithm can facilitate inputs in a virtual environment to attempt to reach the victory condition, and the inputs can thereby be provided into an input log for review. Such inputs can include, but are not limited to, mouse clicks on particular pixels on the screen, keystrokes, button presses or stick movement on a joystick, head positioning coordinates on a virtual reality headset, and so on, depending on the desired implementation. In other example implementations, a video replay can also be generated for view by the quality assurance tester. Further, for specific types of hardware such as video game consoles, the inputs and hardware can be defined for the virtual platform, thereby allowing the quality assurance tester to test under specific environmental conditions. Although example implementations described herein are directed to cloud-based platforms, the example implementations can also be executed on a logical device or any other devices if needed to facilitate the desired implementation.

Aspects of the present disclosure can involve a method for testing an application with a machine learning algorithm, the method involving executing one or more instances of an application (e.g., on a cloud-based system), the one or more instances configured to receive input from the machine learning algorithm configured to provide input to cause an incident for the application; executing the machine learning algorithm to provide the input to the one or more executed instances; and for an incident detected (e.g., by the cloud-based system) in an instance of the one or more instances, the incident causing the application in the instance of the one or more instances to be inoperable, generating an output indicative of the incident causing the application to be inoperable.

Aspects of the present disclosure can involve a computer program for testing an application with a machine learning algorithm, the computer program having instructions involving executing one or more instances of an application (e.g., on a cloud-based system), the one or more instances configured to receive input from the machine learning algorithm configured to provide input to cause an incident for the application; executing the machine learning algorithm to provide the input to the one or more executed instances; and for an incident detected (e.g., by the cloud-based system) in an instance of the one or more instances, the incident causing the application in the instance of the one or more instances to be inoperable, generating an output indicative of the incident causing the application to be inoperable. The computer program may be stored on a non-transitory computer readable medium for execution by one or more processors.

Aspects of the present disclosure can involve an apparatus for testing an application with a machine learning algorithm, the apparatus having a processor configured to execute instructions involving executing one or more instances of an application (e.g., on a cloud-based system), the one or more instances configured to receive input from the machine learning algorithm configured to provide input to cause an incident for the application; executing the machine learning algorithm to provide the input to the one or more executed instances; and for an incident detected (e.g., by the cloud-based system) in an instance of the one or more instances, the incident causing the application in the instance of the one or more instances to be inoperable, generating an output indicative of the incident causing the application to be inoperable. The processor can be any processor as known in the art, such as a central processing unit (CPU) or special purpose hardware such as Field Programmable Gate Array (FPGA), graphical processing unit (GPU), tensor units, and so on in accordance with the desired implementation.

Aspects of the present disclosure can involve a system for testing an application with a machine learning algorithm, the system involving means for executing one or more instances of an application (e.g., on a cloud-based system), the one or more instances configured to receive input from the machine learning algorithm configured to provide input to cause an incident for the application; means for executing the machine learning algorithm to provide the input to the one or more executed instances; and for an incident detected (e.g., by the cloud-based system) in an instance of the one or more instances, the incident causing the application in the instance of the one or more instances to be inoperable, means for generating an output indicative of the incident causing the application to be inoperable.

BRIEF DESCRIPTION OF THE DRAWINGS

FIG. 3 illustrates an example input device table for defining acceptable inputs to an application, in accordance with an example implementation.

FIG. 4 illustrates an example incident table in accordance with an example implementation.

FIG. 5 illustrates an example of management information for the cloud-based system, in accordance with an example implementation.

DETAILED DESCRIPTION

Figure 1:
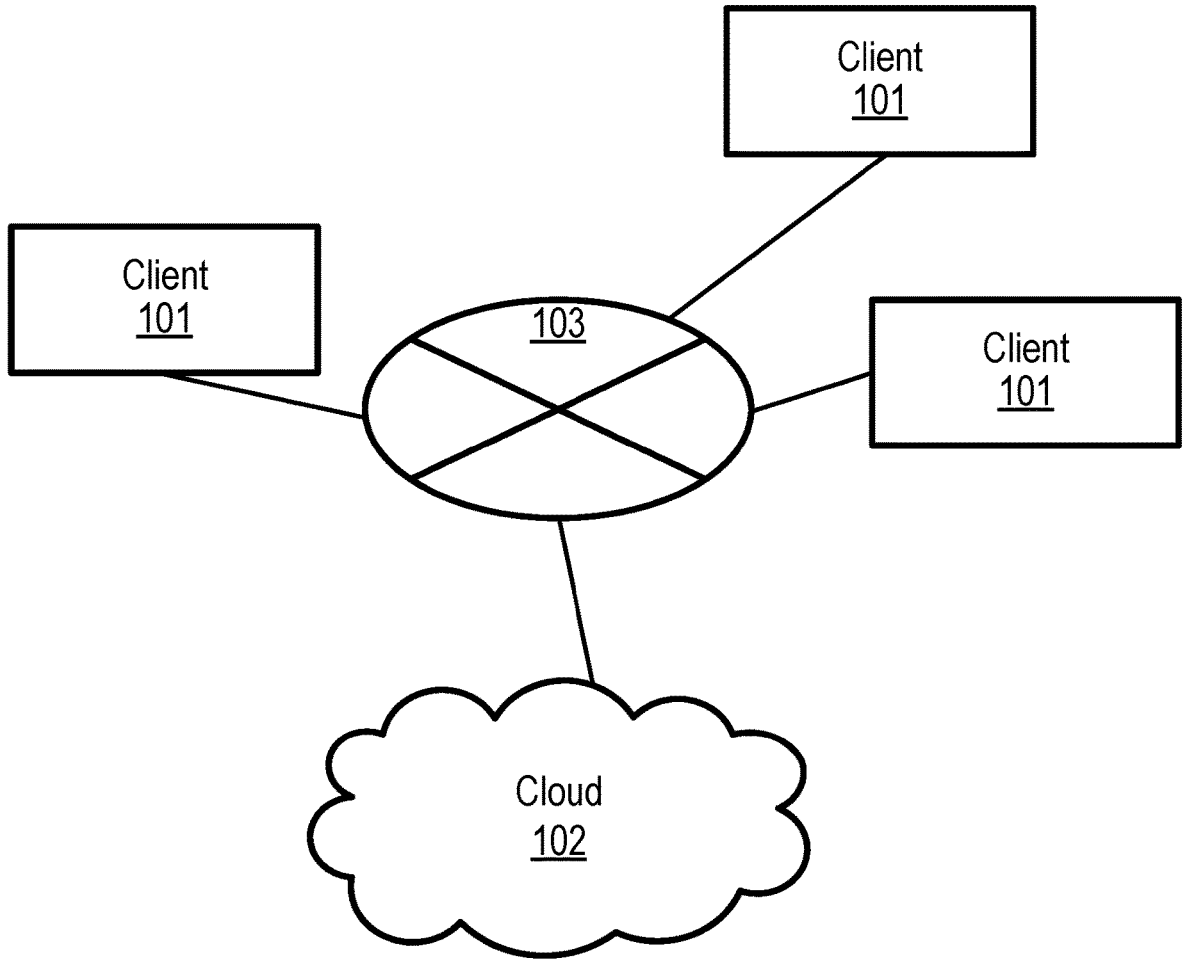
FIG. 1 illustrates an example system upon which the example implementations described herein can be implemented.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

FIG. 1 illustrates an example system upon which the example implementations described herein can be implemented. In an example system, there are one or more client devices 101 that transmit an application for testing to a cloud platform 102. The cloud platform 102 may involve one or more servers and storage systems configured to receive an application, generate virtual machines or virtual platforms to spawn multiple instances of the application, and control the application in each instance through inputs provided by a machine learning algorithm. The client devices 101 and the cloud platform 102 may be interconnected by a network 103. The network 103 can be a wireless or a wired connection and can be facilitated as a local area network (LAN) or over the internet.

Figure 2:
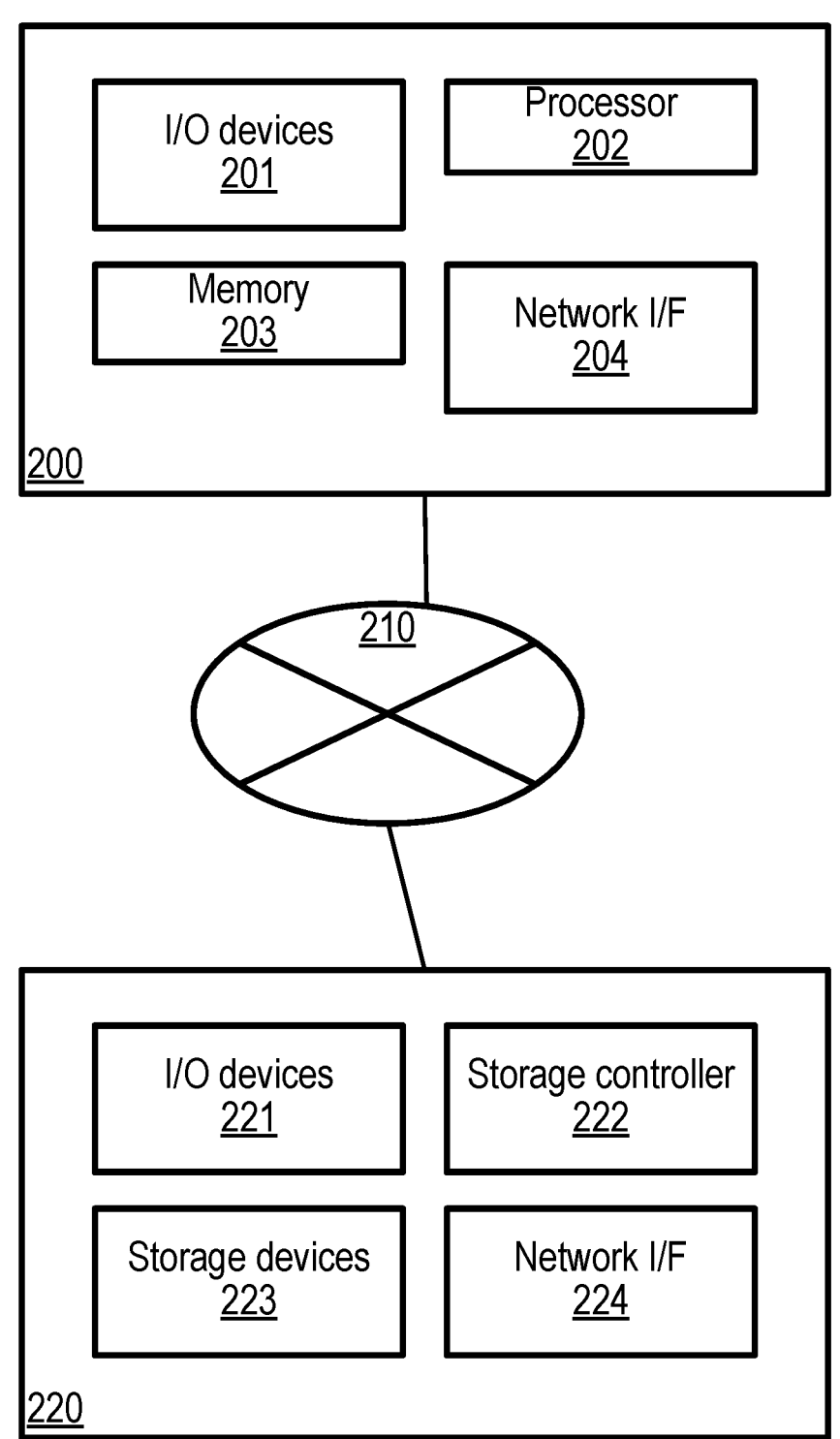
FIG. 2 illustrates an example server/storage system architecture for a cloud, in accordance with an example implementation.

FIG. 2 illustrates an example server/storage system architecture for a cloud 102, in accordance with an example implementation. Cloud 102 may be composed of one or more servers 200 that manage one or more storage systems 220 through one or more internal networks 210. Internal networks 210 can be networks such as Storage Area Network (SAN), Wide Area Networks (WAN) or other networks depending on the desired implementation.

Each of the one or more servers 200 can include I/O devices 201, processors 202 which can take the form of one or more physical processors such as central processing units (CPUs) or otherwise as described herein, memory 203, and Network Interface 204. Memory 203 may include cache memory that takes in live broadcast streaming data from stream broadcasting systems for processing in real time, and other non-transitory memory for loading instructions into processors 202 for executing the algorithms for server 200. In an example implementation, memory 203 may be in the form of flash memory such as solid state devices (SSD), but other implementations such as hard disk drive (HDD) or redundant array of inexpensive disks (RAID) may be utilized, according to the desired implementation. Servers 200 may also interact with one or more storage systems 220, each of which can include I/O devices 221, storage controller 222 which can take the form of one or more physical processors, storage devices 223, and Network Interface 224. In example implementations, data from stream broadcast systems that are transmitted and managed in memory 203 may be destaged to the one or more storage systems 220 to be used in the database for machine learning algorithms.

The one or more storage systems 220 can be configured as a pool to serve as a database for the machine learning algorithms. Storage controller 222 is configured to manage the data in the storage system 220 by providing data from storage devices 223 for use in a pool or for use in logical volumes.

Depending on the desired implementation, processors 202 are in the form of one or more general purpose computing on graphical processing units (GPGPUs), tensor units, streaming processors, or any other kind of special purpose hardware processor configured specifically to execute machine learning algorithm processing on data in accordance with the example implementations. Such special purpose hardware processors may also be arranged in clusters to facilitate the needed processing power for the machine learning algorithms to meet the latency or real-time requirements of the example implementations described herein. In such example implementations, utilizing special purpose hardware configured to execute the particular machine learning algorithms of the example implementations can assist in ensuring that the platform provides replays or input logs to client devices within the desired time frame. In other example implementations, processors 202 can be in the form of general purpose hardware processors such as Central Processing Units (CPUs) or a pool of CPUs allocated from a cloud environment, in accordance with the desired implementation.

In example implementations, processors 202 can execute a method or instructions for testing an application with a machine learning algorithm involving executing one or more instances of an application, the one or more instances configured to receive input from the machine learning algorithm; executing one or more instances of an application, the one or more instances configured to receive input from the machine learning algorithm; executing the machine learning algorithm to provide the input to the one or more executed instances; and for an incident detected in an instance of the one or more instances, the incident causing the application in the instance of the one or more instances to be inoperable, generating an output indicative of the incident causing the application to be inoperable.

Depending on the desired implementation, such an incident can be a fault screen. Fault screens can be any kind of error screen that is displayed by the underlying operating system or the application in the event of a system or application error. Such fault screens occur when there is a hardware failure, an unexpected termination of a process, a system crash, or so on as known in the art. Such fault screens are well known in the art to be in a consistent in form, and so can be detected easily by feature extraction of the screenshot through any object detection machine learning algorithm (e.g., by detecting features associated with consistent background color with overlaid text that does not change after a threshold period of time), or by a custom detection algorithm that detects particular fault screens from screenshots/video of the instance and provides the feedback to the machine learning algorithm. One of ordinary skill in the art can train the machine learning algorithm against the desired fault screens to be detected to configure the machine learning algorithm to detect the desired fault screens in accordance with the desired implementation. Examples of fault screens can involve, but are not limited to, blue screens of death, black screens of death, other screens of death, kill screens for game applications, hardware error screens, and so on.

Depending on the desired implementation, the output can involve video of the instance of the one or more instances. Such video can be generated in accordance with any desired implementation as known in the art. For example, the instance can be executed with a screen/video recording application as known in the art that is configured to cache the most recent time period of the incident for a threshold period of time, or up to a specific amount of memory consumed. The video can also be composed from accumulated screenshots, where the screenshots are taken at any desired framerate in accordance with the desired implementation. Further, if dedicated resources are needed, screenshots/videos can be recorded or processed by a dedicated machine or other in accordance with a desired implementation (e.g., via video splitter from one server to another server dedicated for screenshot/video processing).

Depending on the desired implementation, the output can involve audio of the application in the instance of the one or more instances. Such audio can be generated in accordance with any desired implementation as known in the art. For example, the instance can be executed with an audio recording application as known in the art that is configured to record the audio of the most recent time period of the incident for a threshold period of time, or up to a specific amount of memory consumed.

Depending on the desired implementation, the output can involve haptic feedback from the application in the instance of the one or more instances. Such haptic can be generated in accordance with any desired implementation as known in the art. For example, the application can be associated with a device configured to give haptic feedback (e.g., a glove, a chair, etc.) and the control signals from the application directed to such a device can be recorded and analyzed against desired thresholds.

Depending on the desired implementation, the output can involve an input log for the application. For example, the instance can be executed along side detection applications, such as a keystroke logger, a mouse logging application, an input recorder, and so on in accordance with the desired implementation, which can be configured to output an input log. In another example implementation, the inputs provided by the machine learning algorithm can be stored in a log file in the desired format through any desired implementation.

Depending on the desired implementation, the input can be restricted based on devices selected for testing on the application. For example, if the input device is a joystick or game controller, certain inputs (e.g., simultaneous left-right direction) may not be physically possible and therefore restricted. Restrictions to input can also be used to differentiate between different types of inputs devices (e.g., two-button mouse versus three-button mouse), to reject input from one device when another device is providing input (e.g., priority of voice over button input), to test multiple inputs from multiple devices based on available device connections, and so on. Further details are provided with respect to FIG. 3.

Depending on the desired implementation, the input can involve network data transmitted to the application. Network data can involve any data transmitted to the application via a network (e.g, internet, local area network, cellular, etc.) In such an example implementation, the application can be, for example, a mobile device application configured to receive input from the internet, a router application that can be configured to receive input from multiple devices, an application for an edge device configured to receive instructions from a server, server input to a computer application, and so on in accordance with the desired implementation. Such network data can involve packets transmitted in accordance with any desired protocol (e.g., TCP/IP, UDP, etc.) to simulate network communications with the application. In such an example implementation, the machine learning algorithm can be configured in accordance with the desired implementation to simulate such network data as the input.

Depending on the desired implementation, the incident can be an operational freeze. Any operational freeze can be used to detect an incident. Operational freezes involve incidents that cause the application to lock up and become unresponsive, such as, but not limited to, infinite loops, screen freezes, and so on in accordance with the desired implementation. Such incidents can be detected by the machine learning algorithm through feature extraction or other methods in accordance with any desired implementation, or through a separate detection application configured to provide feedback to the machine learning algorithm. For example, screen freezes can be detected if the screenshot detection function detects the same screenshot over a threshold period of time regardless of input being provided, which can be detected by the machine learning algorithm or by the separate screenshot detection application. Infinite loops can similarly be detected based on similar implementations based on non-responsiveness to input by either the machine learning algorithm or a separate application.

Depending on the desired implementation, the incident can be determined from an application log of the application. Depending on the underlying application, some applications may generate their own application logs for error handlers, exception handlers, and so on, which can be used as the victory condition for the machine learning algorithm. For example, if an application only generates application logs in response to an error or exception, the generation of such an application log can be used as feedback to the machine learning algorithm that an incident has occurred. In another example implementation, the application generates a constant application log to record and output certain metrics associated with the application. In such an example implementation, such an application log can be read by the machine learning algorithm to determine if an incident has occurred based on specific metrics (e.g., specified by the user) within the application log that would be indicative of an incident. For example, an application log that records CPU usage can be used to indicate an incident has occurred if the CPU usage has exceeded a threshold.

Depending on the desired implementation, the incident can be determined from a debug hook. In some example implementations, the user may desire to inject code or execution at specific runtime lines of the application, or intercept operation for the application for analysis to read variable values. The output of the debug hook (e.g, variable values, error handlers, etc.) can be used as feedback to detect an incident as defined in accordance with the desired implementation.

Although incidents are described as being detected by the machine learning algorithm, other detection application can be used, and such detection applications can simply inform the machine learning algorithm that an incident has occurred in accordance with the desired implementation. For example, the detection application can be run across multiple instances of the application so as to reduce the burden on the machine learning algorithm, and can be programmed to detect the desired incident.

Although example implementations described herein are directed to cloud-based implementations, they can also be extended to user devices or microservices of the user. The user may, for example, implement the example implementations herein locally on a microservice having the special purpose hardware and computer environment as illustrated in FIG. 2, with the models loaded on the microservice via cloud delivery. In other example implementations, it can be facilitated onto a local user device as well, such as a mobile phone, or laptop.

FIG. 3 illustrates an example input device table for defining acceptable inputs to an application, in accordance with an example implementation. In an example implementation, some applications may operate in an environment in which only certain types of inputs are permitted. For example, a document viewer application may permit keyboard inputs, touch inputs, and mouse inputs, but may not necessarily be compatible with voice inputs. In another example, a video game console may only accept inputs from specific peripheral devices (e.g., a joystick, a controller, a hitbox etc.), the configuration of which may inherently disable specific types of inputs (e.g. a joystick disables simultaneous left/right input, a console may only permit certain directional and button inputs, etc.). This input device table is used to configure the machine learning algorithm to restrict the types of inputs available to an application in order to simulate the environment or application configuration. The inputs can be provided through any method in accordance with the desired implementation. For example, inputs can be simulated in software through the use of software hooks to simulate input, through emulators to provide input, or via driver input in accordance with the desired implementation. Physical input implementations can be utilized if desired, such as robots or special hardware to provide physical inputs on hardware. In example implementations, virtual debug hooks can be used that traverse the screen not only visually but also through code (e.g., such as a hierarchy view) to interact with specific input/GUI elements directly. In such example implementations, debug hooks can involve a program that can intercept the operation of an application for analysis and injection of code or execution thereof. One example is defining the debug hook to stop at a specific line to execute code, to stop at a line to read the value of a variable, or to wait for the execution of a specific line such as an error handler.

The input device can also be associated with a type of input in order to match the connection ports of the device of the underlying application under test. For example, a game console may only have two USB ports and two joystick input ports. Thus, when devices are selected for test, a maximum of two USB input devices and two joystick devices can be selected through the user interface for test.

In another example implementation, there can be a direct hook into voice recognition so that text input (e.g., text input of "turn on lights") is used and interpreted as opposed to utilizing an audio recording. In another example implementation, audio recording may also be used to input audio not yet interpreted to text (e.g., to test noisy environments or specific frequencies). Input can also involve sensor data such as global positioning satellite (GPS), gyroscope measurements, location information, and so on in accordance with the desired implementation.

FIG. 4 illustrates an example incident table in accordance with an example implementation. The incident table defines the type of incidents that render an application to be inoperable and the conditions that define such an incident. For example, a fault incident is detected upon an appearance of a fault screen. Such definitions can be used by the machine learning algorithm to determine the victory or target condition to provoke such an incident. The detection can be screenshot based, such that when certain frames or screens are reached, then the condition is determined to be met by the machine learning algorithm as illustrated in FIG. 4. However, other inputs besides screenshots can also be used if available, and the present disclosure is not limited thereto. For example, logs, text, and code can be also detected as inputs. In an example implementation, a debug hook can also be used as an input for detection (e.g., detecting whether a variable has a value of null). Code tracing can also be utilized if the code is available for analysis alongside the execution of the application. Further, logs output by the application itself, or by the compiler of the application can also be utilized in real time for detecting specific victory conditions indicative of the application being rendered inoperable.

For example, some applications such as games may have their own definable incidents. In an example of a platform game, a player character getting stuck within a wall and being unable to move despite all possible inputs can be detected from an observation of the same set of frames repeatedly despite all possible inputs. Another way to set the victory condition based on code tracing can include, but is not limited to, detecting whether the coordinates of a player character overlaps coordinates of the wall, whether the character coordinates trigger or exceed some boundary (e.g., out of bounds from the game screen). In another example implementation, a debug hook returning an exception regarding character coordinates can also be utilized.

Other conditions may also be utilized that are not screen based depending on the desired implementation. For example, another type of incident can be if the application consumes more random access memory (RAM) than the environment permits, whether deadlock occurs in the underlying central processing units (CPU), whether power consumption exceeds a threshold, whether latency or input latency exceeds a threshold, and so on, in accordance with the desired implementation.

Incidents can also be defined based on various elements, for example, from output logs, stack traces, error codes, exceptions, specifically defined errors, and/or debug hooks that are configured to listen into the application for errors or exceptions in the internal log. Depending on the desired implementation, such elements can be a separate entity such as a file stored in a storage system, hard disk drive, or other media. Such elements can also be compilations created not only by the application itself, but through third party applications (e.g., operating system specific event log) depending on the desired implementation.

Other incidents can also be utilized as the victory or target condition, and the present disclosure is not particularly limited thereto. One example can involve the detection of a device reboot, as some devices may not have a fault screen and simply execute a reboot in response to a kernel fault. Another example can involve specific audio feedback (e.g., "I'm sorry I didn't get that" for a voice recognition application) or when an audio output loops its last byte indefinitely due to a kernel crash. Other incidents can also include, but are not limited to, continuous CPU usage, power fluctuations, level of power draw, and unresponsive controls. Depending on the desired implementation, the incident detection can be a separate standalone program that provides measurements of desired metrics for incident detection (e.g, a monitoring application that monitors CPU usage and feeds the measurement to the machine learning algorithm).

The example implementations described herein can also be extended to test interoperability between machines, in accordance with the desired implementation. Such examples can include using multiple machines to execute a distributed denial of service (DDOS) attack against one machine to determine resiliency, sending code via text messages from mobile devices to a single mobile device to cause the targeted single mobile device to become inoperable, to simulate a packet relay attack, and so on in accordance with the desired implementation. In such example implementations, the input system and monitoring system can be instantiated as separate entities that exist on different machines which communicate over a switch, network, or some other hub in accordance with the desired implementation.

Physical states can also be the victory or target condition depending on the underlying platform/physical hardware of the application. For example, the detection of a smartphone vibrating endlessly without resolution can be used as a condition. The head of a hard disk drive platter or any other robotic arm or other edge device with mechanical parts (e.g., garage door, sensor, etc.) becoming misaligned can also be another incident. In another example involving holographic implementations, conditions set based on the output to the holograph can also be utilized. Non-screen hardware representations of the incident state (e.g., specific LEDs triggered in a car or elevator) may also be utilized to facilitate the desired implementation. Timing based representations can also be used to indicate the incident, such as an inaccurate clock, LEDs blinking in a rhythmic manner, Morse code, and so on. Further, a missing state or output that was expected may also be considered as an incident (e.g., a speaker failed to produce expected audio output).

Incidents to be used as the victory or target conditions can also be directed to specific memory consumption levels (e.g., application consumes over 1 GB of RAM or 100% CPU).

Infinite loops may also be used as an incident. Examples can involve repeats of the same output frames repeatedly over a threshold. Such implementations can be modified to facilitate the desired implementation. For example, in games, there may be an infinite combo made by a player character that continuously loops. In another example, clicking "Ok" to a popup dialog results in the same popup dialog appearing again could be an incident. In other example implementations, other infinite loops can be detected through other methods depending on the underlying application, such as infinite audio loops, infinite device state loops, and so on.

Other incidents can further involve exceptions generated by the application being tested such as a segfault or stack overflow, a blue screen or any other kernel crash, misinterpreted/lost input (e.g., a mouse being only able to move the cursor in the lower half of a screen or input not working at all), or application specific error boxes/messages, either from a third part application (e.g., via an error reporter), or through a dialog box within the application. Incidents can also include inability to interact with expected elements, or inability to terminate a program. In addition, such applications can also be tested through a virtual machine or kernel in accordance with the desired implementation.

FIG. 5 illustrates an example of management information for the cloud-based system, in accordance with an example implementation. Such management information can include the application identifier (ID) as associated with a particular application, the type of incidents selected by the user to test the application, configuration settings of the hardware/software/input environment of the application, and user ID of the user to whom the output of replay inputs are directed.

Figure 6:
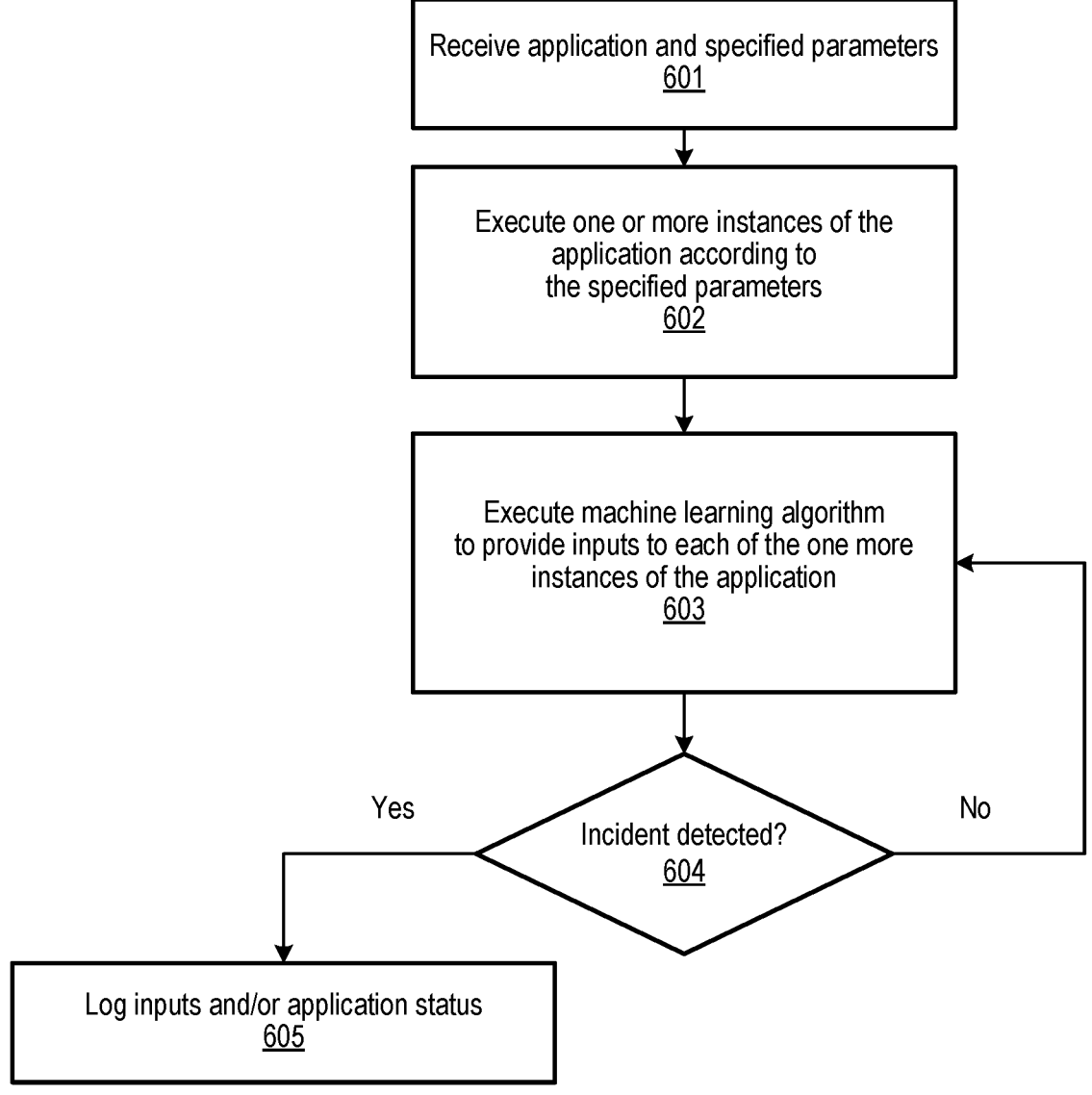
FIG. 6 illustrates an example flow diagram of the cloud-based system, in accordance with an example implementation.

FIG. 6 illustrates an example flow diagram of the cloud-based system, in accordance with an example implementation. At first, the cloud-based system receives an application for testing along with specific parameters from a user, such as the types of incidents to test for, the environment definition, input device restrictions, and so on at 601. At 602, multiple instances of the application are spawned according to the specified parameters.

At 603, the machine learning algorithm provides input to each of the multiple instances in order to reach the type of incident specified in the parameters. In example implementations, neural networks such as Convolutional Neural Networks (CNNs) or other machine learning implementations such as unsupervised learning, can be used to analyze screenshots, metrics, logs, audio, and/or other input of the applications in a frame-by-frame or time step manner based on the inputs provided, as such machine learning algorithms are suited to understanding specific screens such as fault screens and/or accompanying metrics, logs, audio, and/or other input. However, other machine learning algorithms can be utilized in accordance with the desired implementation, and the present disclosure is not limited thereto.

At 604, the machine learning algorithm will continue providing the inputs to the instances until an incident is detected. If so (Yes), then the application status and inputs can be output as a log at 605 so that the user can see the inputs used to recreate the incident. Depending on the desired implementation, the output can be in the any desired form, such as but not limited to a video based on the accumulated screenshots, an input log which can be executed for replay on the user device or user application, audio, GPS, gyroscopic measurements, an output log describing the state of the machine or process as a result of the incident, and so on. Further examples are provided with respect to FIG. 7. Any other aspect of the instance can be included in the log besides the input, and the present disclosure is not limited thereto.

There are several ways to construct and train the machine learning algorithm. In an example implementation, unsupervised learning can be utilized on the applications under test. The unsupervised learning algorithms can be configured to provide the inputs to the applications with the reward being given for provoking desired incidents (e.g., fault screens, loss of input, exceptions, error codes, etc.) of the test. In another example implementation, supervised learning can also be utilized wherein the supervised learning algorithms are trained against input provoking known incidents that the application developer is aware of. For screenshot based implementations, CNN can be applied to monitor screenshots of the instances under test, and can be trained to determine the appropriate inputs to cause an incident based on the features extracted from the screenshots. The CNN can be trained against previous screenshots of incidents with the corresponding input log for known incidents of tested applications, or otherwise in accordance with the desired implementation. In another example implementation, the machine learning algorithm can be constructed through Generative adversarial networks (GANs) wherein the adversarial network attempts to check for incidents in response to the provided input from the input network.

Figure 7:
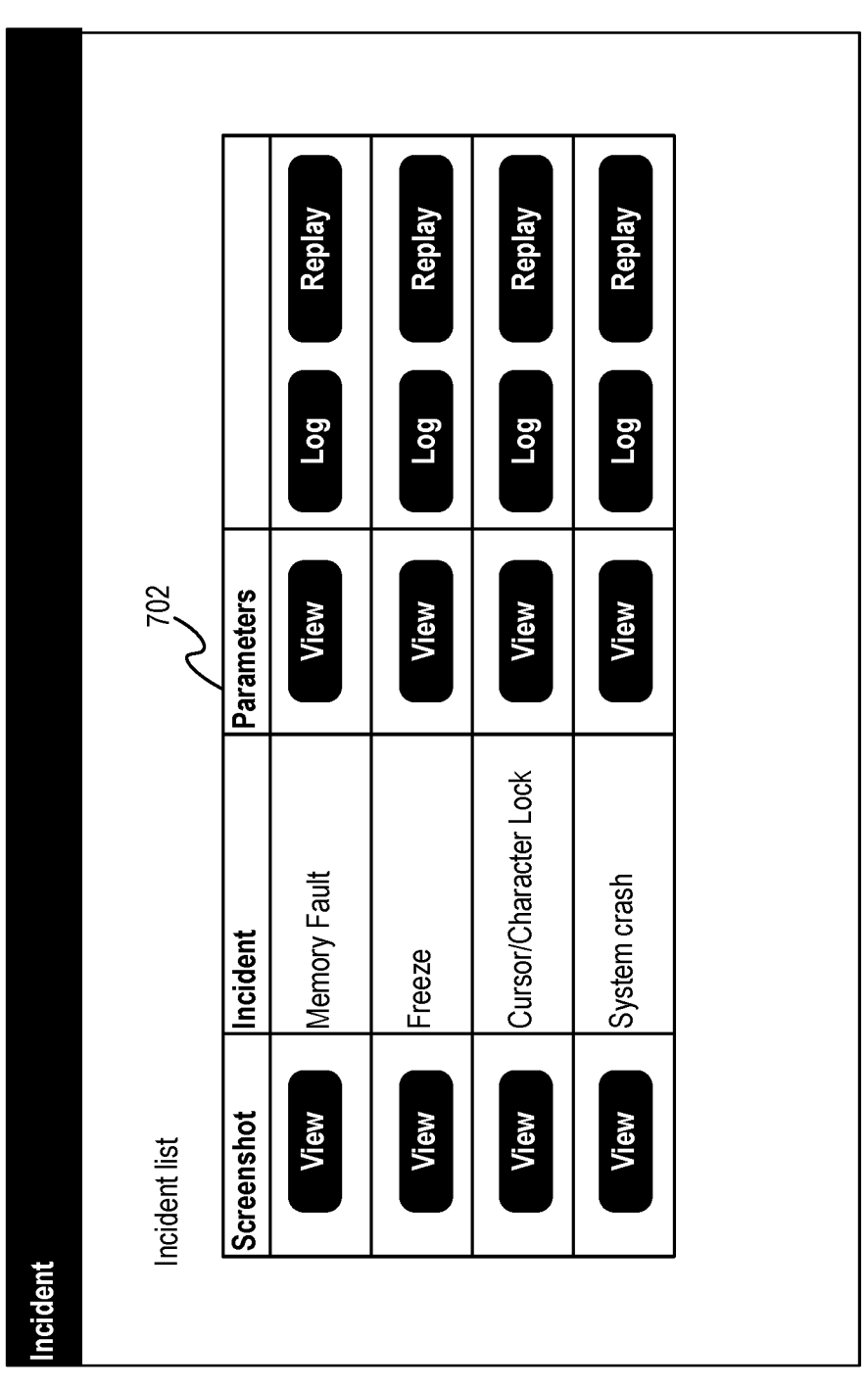
FIG. 7 illustrates an example user interface for output of the incident, in accordance with an example implementation.

FIG. 7 illustrates an example user interface for output of the incident, in accordance with an example implementation. In an example, the user can view a replay of the incident for the provided application as provided by the cloud-based system. Such outputs can involve a final screenshot of the incident, the type of incident detected, parameters of the application and environment, an input and output log, and a video replay of the application as illustrated in the interface 702. Depending on the desired implementation, the output can also be in the form of audio feedback for audio-based applications such as voice recognition software or for applications that only provide audio output. For more information, metrics of the process/machine such as metrics associated with CPU, memory, GPU, temperature, power consumption, network utilization, latency and so on can also be provided. Other output can be utilized in accordance with the desired implementation and the underlying platform of the application, and the present disclosure is not limited thereto. For example, applications directed to haptic systems can also involve the replay of the underlying haptic output, applications directed to systems involving other types of sound, tactile, olfactory, gustatory, or light output can also be configured to provide the corresponding output. Other output for replay can also include positional based input (e.g., based on detection from camera, depth cameras, etc.), GPS measurements, altimeter measurements, positional measurements, and so on can also be utilized. Further, the example implementations described herein can also be configured to take in underlying input signals or any combination of types of inputs to facilitate the application on its underlying platform, such as any combination of electromagnetic signals, light signals, LiDAR or radio signals for computer vision applications, radio signals for radar based applications, sonar, light polarization/orientation, and so on, in accordance with the desired implementation. Such combinations of inputs can be determined based on the underlying application and the platform to be tested. For networked/network based applications, simulated network data (e.g., packets, traffic data, etc.) can also be used as the input.

Figure 8:
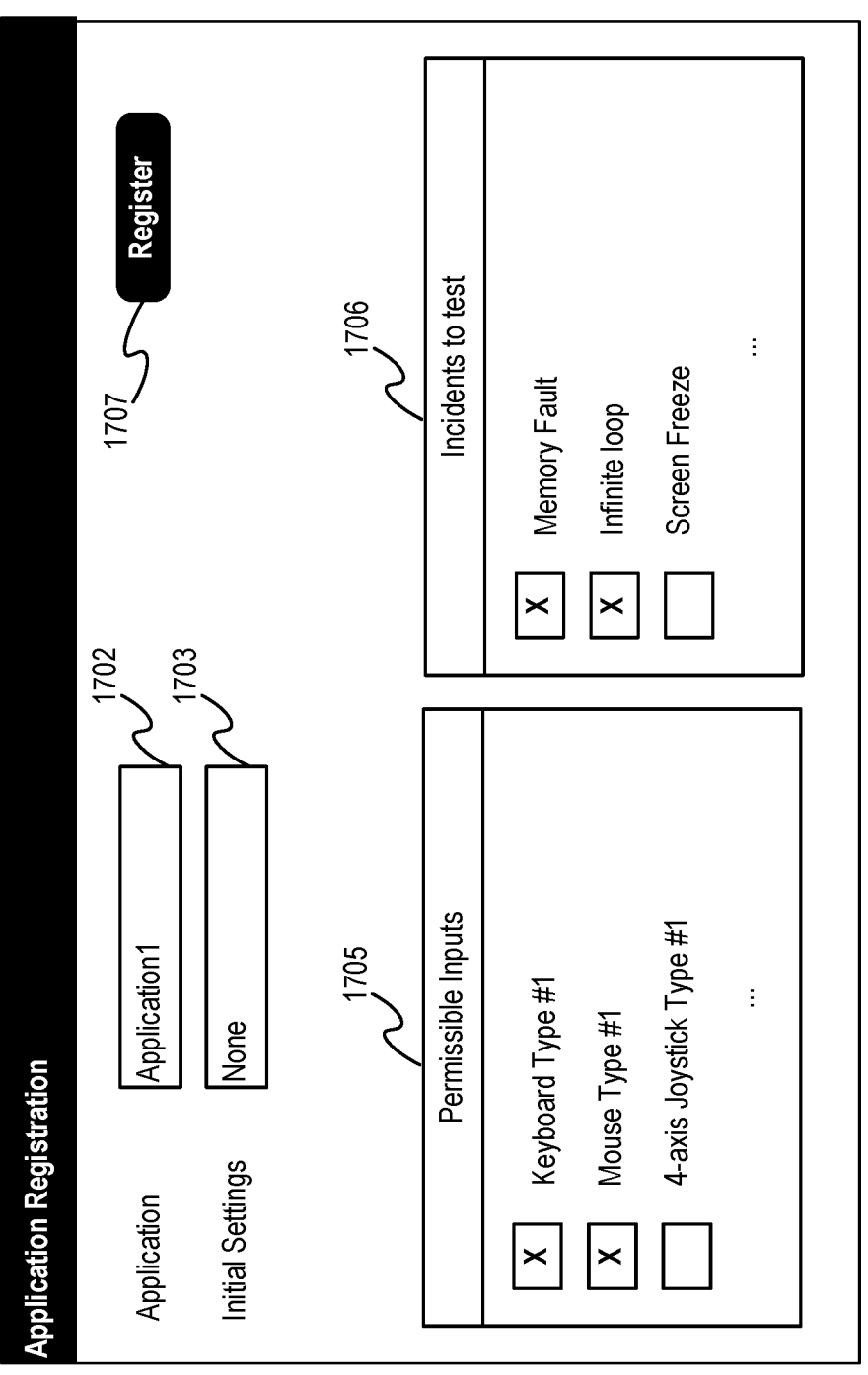
FIG. 8 illustrates an example user interface for submitting an application and parameters for incident testing, in accordance with an example implementation.

FIG. 8 illustrates an example user interface for submitting an application and corresponding parameters for incident testing, in accordance with an example implementation. The interface can include the selection of an application to be submitted from a user device or user account 1702, any initial settings or environmental conditions to specify for the application 1703, a set of permissible input devices for the application 1705, and types of incidents to test 1706. Once the information is selected, the user can register the application and parameters to the cloud system as shown at 1707. Pre-defined incidents can also be included in accordance with the desired implementation, such as, but not limited to, operational freezes, exceptions, error codes, and stack traces.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for testing an application with a machine learning algorithm, the method comprising:
    executing one or more instances of an application, the one
        or more instances configured to receive input from the machine learning algorithm configured to provide input to cause one or more types of incidents for the application selected from a plurality of defined types of incidents for the application, each of the defined types of incidents defined with a victory or target condition for the machine learning algorithm;

executing the machine learning algorithm to provide the input to the one or more executed instances, wherein permissible inputs provided by the machine learning algorithm are restricted based on one or more input devices selected for testing on the application from a plurality of input devices; and for a type of incident from the one or more selected types of incidents detected in an instance of the one or more instances, the type of incident causing the application in the instance of the one or more instances to be inoperable, generating an output indicative of the type of incident causing the application to be inoperable.

2. The method of claim 1, wherein the type of incident is a fault screen.

3. The method of claim 1, wherein the output comprises video of the instance of the one or more instances.

4. The method of claim 1, wherein the output comprises audio of the application in the instance of the one or more instances.

5. The method of claim 1, wherein the output comprises haptic feedback from the application in the instance of the one or more instances.

6. The method of claim 1, wherein the output comprises an input log for the application.

7. The method of claim 1, wherein the input is restricted based on devices selected for testing on the application.

8. The method of claim 1, wherein the input comprises network data transmitted to the application.

9. The method of claim 1, wherein the type of incident is an operational freeze.

10. The method of claim 1, wherein the type of incident is determined from an application log of the application.

11. The method of claim 1, wherein the incident is determined from a debug hook.

12. A non-transitory computer readable medium, storing instructions for testing an application with a machine learning algorithm, the instructions comprising:

executing one or more instances of an application, the one or more instances configured to receive input from the machine learning algorithm configured to provide input to cause one or more types of incidents for the application selected from a plurality of defined types of incidents for the application, each of the defined types of incidents defined with a victory or target condition for the machine learning algorithm;

executing the machine learning algorithm to provide the input to the one or more executed instances, wherein permissible inputs provided by the machine learning algorithm are restricted based on one or more input devices selected for testing on the application from a plurality of input devices; and for a type of incident from the one or more selected types of incidents detected in an instance of the one or more instances, the type of incident causing the application in the instance of the one or more instances to be inoperable, generating an output indicative of the type of incident causing the application to be inoperable.

13. The non-transitory computer readable medium of claim 12, wherein the type of incident is a fault screen.

14. The non-transitory computer readable medium of claim 12, wherein the output comprises video of the instance of the one or more instances.

15. The non-transitory computer readable medium of claim 12, wherein the output comprises audio of the application in the instance of the one or more instances.

16. The non-transitory computer readable medium of claim 12, wherein the output comprises haptic feedback from the application in the instance of the one or more instances.

17. The non-transitory computer readable medium of claim 12, wherein the output comprises an input log for the application.

18. The non-transitory computer readable medium of claim 12, wherein the input is restricted based on devices selected for testing on the application.

19. The method of claim 1, wherein the input comprises network data transmitted to the application.

20. An apparatus for testing an application with a machine learning algorithm, the apparatus comprising:

a processor, configured to:

execute one or more instances of an application, the one or more instances configured to receive input from the machine learning algorithm configured to provide input to cause one or more types of incidents for the application selected from a plurality of defined types of incidents for the application, each of the defined types of incidents defined with a victory or target condition for the machine learning algorithm;

execute the machine learning algorithm to provide the input to the one or more executed instances, wherein permissible inputs provided by the machine learning algorithm are restricted based on one or more input devices selected for testing on the application from a plurality of input devices; and for a type of incident from the one or more selected types of incidents detected in an instance of the one or more instances, the type of incident causing the application in the instance of the one or more instances to be inoperable, generate an output indicative of the type of incident causing the application to be inoperable.

* * * * *